(12) United States Patent
Kianush et al.

(10) Patent No.: US 9,584,209 B2
(45) Date of Patent: Feb. 28, 2017

(54) MULTIPLE ANTENNA DISTRIBUTED RADIO SYSTEM

(71) Applicant: NXP B.V., Eindhoven (NL)

(72) Inventors: Kaveh Kianush, Eindhoven (NL); Evert-Jan Pol, SonenBreugel (NL)

(73) Assignee: NXP B. V., Eindhoven (NL)

( * ) Notice: Subject to any disclaimer, the term of this patent is extended or adjusted under 35 U.S.C. 154(b) by 0 days.

(21) Appl. No.: 14/587,572

(22) Filed: Dec. 31, 2014

(65) Prior Publication Data
US 2016/0191138 A1    Jun. 30, 2016

(51) Int. Cl.
*H04B 7/08* (2006.01)
*H04L 27/152* (2006.01)
*G06F 13/40* (2006.01)
*H04B 1/16* (2006.01)

(52) U.S. Cl.
CPC ........... *H04B 7/0885* (2013.01); *G06F 13/40* (2013.01); *H04B 1/16* (2013.01); *H04L 27/152* (2013.01)

(58) Field of Classification Search
CPC .. H01Q 1/32; H01Q 3/26; H03D 3/24; H03K 19/177; H04B 1/04; H04B 1/06; H04B 1/10; H04B 1/16; H04B 1/18; H04B 1/38; H04B 7/04; H04B 7/08; H04B 7/0885; H04B 7/10; H04B 10/00; H04B 17/02; H04K 1/10; H04L 1/00; H04L 1/02; H04L 5/12; H04L 7/00; H04L 7/0087; H04L 27/00; H04L 27/06; H04L 27/08; H04L 27/16; H04L 27/26; H04L 27/152

USPC ........ 370/248; 375/219, 220, 232, 260, 267, 375/316, 327, 340, 347, 354, 362; 455/69, 70, 90.3, 101, 115.1, 137, 216, 455/273, 277.1, 307, 334
See application file for complete search history.

(56) References Cited

U.S. PATENT DOCUMENTS

| | | | | |
|---|---|---|---|---|
| 5,715,274 | A * | 2/1998 | Rostoker | H01L 23/48 375/130 |
| 6,792,258 | B1 * | 9/2004 | Nokes | H04B 7/0871 375/347 |
| 8,019,027 | B2 * | 9/2011 | Mada | H03G 3/3068 375/316 |
| 8,503,507 | B2 | 8/2013 | Kianush et al. | |
| 2001/0033188 | A1 * | 10/2001 | Aung | G11C 7/22 327/141 |
| 2004/0120422 | A1 * | 6/2004 | Lin | H04L 27/34 375/316 |

(Continued)

FOREIGN PATENT DOCUMENTS

| | | |
|---|---|---|
| WO | WO-2009/014339 A2 | 1/2009 |
| WO | WO-2009/014339 A3 | 1/2009 |

OTHER PUBLICATIONS

Objective Data Sheet—TEF669X Low IF Tuner High performance one-chip—Rev. 1.17—Nov. 12, 2014, 1-32.

(Continued)

*Primary Examiner* — Shawkat M Ali

(57) ABSTRACT

A radio receiver including: a serial data interface configured to receive a serial data signal from another radio receiver; a clock/data recovery circuit configured to produce a clock signal and a data signal from the serial data signal; and a radio front-end configured to receive the clock signal from the clock/data recovery circuit to produce a received signal; and signal combining circuit configured to combine the received signal and the data signal.

11 Claims, 4 Drawing Sheets

(56) References Cited

U.S. PATENT DOCUMENTS

| | | | |
|---|---|---|---|
| 2005/0184905 A1* | 8/2005 | Kobayashi | G01S 19/252 342/357.31 |
| 2006/0094379 A1* | 5/2006 | Gamo | H04B 7/0871 455/137 |
| 2006/0194562 A1* | 8/2006 | Marrah | H04H 40/90 455/334 |
| 2007/0127609 A1* | 6/2007 | Kawada | H04B 7/082 375/347 |
| 2008/0248770 A1* | 10/2008 | Schultz | H04B 1/005 455/188.1 |
| 2009/0080559 A1* | 3/2009 | Armbruster | H04B 7/0808 375/267 |
| 2010/0062737 A1* | 3/2010 | Zhong | H04B 7/0817 455/277.1 |
| 2010/0255802 A1* | 10/2010 | Pan | H04B 15/06 455/216 |
| 2011/0158339 A1* | 6/2011 | Tuttle | H04B 7/0682 375/267 |
| 2011/0158357 A1 | 6/2011 | Djadi et al. | |
| 2013/0122958 A1* | 5/2013 | Sittler | H04B 15/04 455/556.2 |
| 2014/0241478 A1* | 8/2014 | Malipatil | H04L 7/007 375/362 |
| 2015/0003550 A1 | 1/2015 | Koppelaar | |
| 2015/0016576 A1 | 1/2015 | Koppelaar | |

OTHER PUBLICATIONS

Product Data Sheet—TEF7000 Digital Tuner IC—Rev. 02—Feb. 23, 2009, 1-63.

Product Data Sheet—SAF775x One-chip multi-tuner car radio and audio system—Rev. 1—Sep. 20, 2013, 1-71.

Product Data Sheet SAF7741HV—Dual IF car radio and audio DSP (N1F) Rev. 07—Apr. 28, 2010, 1-81.

Extended European Search Report for Patent Appln. No. 15199530.5 (Mar. 14, 2016).

* cited by examiner

MULTIPLE ANTENNA DISTRIBUTED RADIO SYSTEM

BACKGROUND

The performance of radio receivers may be reduced by the multipath reception phenomenon. This occurs when the transmitted signal reaches the receiver antenna by a direct path as well as indirect paths through reflections from objects. Depending on the delay between the direct and the reflected signals, they may add destructively and thereby interrupt normal operation of the receiver. For broadcast systems, this phenomenon is often observed in FM receivers, where the wavelength of the radio signals and the distance to the surroundings (buildings, mountains, etc.) make this undesired multipath effect very noticeable to the user.

In stationary situations, the position of the radio can be changed by just a few centimeters to ensure the antenna is at a location where the signals add constructively and the multipath distortion is avoided. In car radios, however, the antenna of the radio receiver will be subjected to continuously changing conditions and therefore multipath reception remains a major limitation in the quality of the received audio. Digital Broadcasting, making use of multi-carrier orthogonal frequency-division multiplexing (OFDM) signals spread over a relatively wide frequency range, mitigates this shortcoming of analog FM radio. But due to slow worldwide penetration of digital radio standards, FM radio reception remains widely used by car radio users and manufacturers.

Therefore, in high-end applications, car manufacturers provide at least one additional antenna such that the two (or more) antennae will be separated by a distance that is about a quarter of the wavelength of the signals of interest. In this way, signals received by the two antennae are "uncorrelated" with respect to reflections—when one antenna is in a "signal dip" due to multipath interference, the other antenna should receive a strong signal. More advanced radio receivers apply phase diversity algorithms that make use of these uncorrelated signals at multiple antennae, adjusting signal delays in the receiver system such that signal addition is constructive before demodulation. This eliminates multipath distortion at the audio output. This may be achieved by providing separate tuners (radio front-ends) for each antenna and combining the signals digitally by a phase diversity algorithm prior to demodulation.

To achieve constructive addition of signals, all signal processing steps in the separated paths, prior to phase diversity operation, make use of clock and timing references derived from the same crystal reference. This is to say that, for example, radio frequency (RF) mixers in each antenna path converting signals to baseband are driven by Local Oscillator (LO) signals from the same phase locked loop (PLL) and/or reference crystal oscillator to the PLL(s). Small, but constant, phase offsets can be corrected for by most phase diversity algorithms. But even a small frequency offset, due to physically different crystals, translates to continuously changing phase that cannot be distinguished from differences in time of arrival at the antennae by phase diversity algorithms. This constraint limits the practical distance between the 2 (or more) receivers configured as phase diversity system.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to a radio receiver including: a serial data interface configured to receive a serial data signal from another radio receiver; a clock/data recovery circuit configured to produce a clock signal and a data signal from the serial data signal; and a radio front-end configured to receive the clock signal from the clock/data recovery circuit to produce a received signal; and signal combining circuit configured to combine the received signal and the data signal.

Further various embodiments relate to a radio receiver comprising: a radio front-end configured to receive a first clock signal from an oscillator to produce a received signal; and a serial data interface configured to transmit a serial data signal to another radio receiver, wherein the serial data signal provides the received signal and a second clock signal to the other radio receiver, wherein the second clock signal corresponds to the first clock signal.

Further various embodiments relate to a radio system including: a first radio receiver including: a first radio front-end configured to receive a first clock signal from an oscillator to produce a first received signal; and a first serial data interface configured to transmit a serial data signal to a second radio receiver, wherein the serial data signal provides the first received signal and a second clock signal to the second radio receiver, wherein the second clock signal corresponds to the first clock signal; the second radio receiver including: a second data interface configured to receive the serial data signal from the first radio receiver; a clock/data recovery circuit configured to produce the second clock signal and the first received signal from the serial data signal; a second radio front-end configured to receive the second clock signal from the clock/data recovery circuit to produce a second received signal; and a signal combining circuit configured to combine the first received signal and the second received signal.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Figure 1:
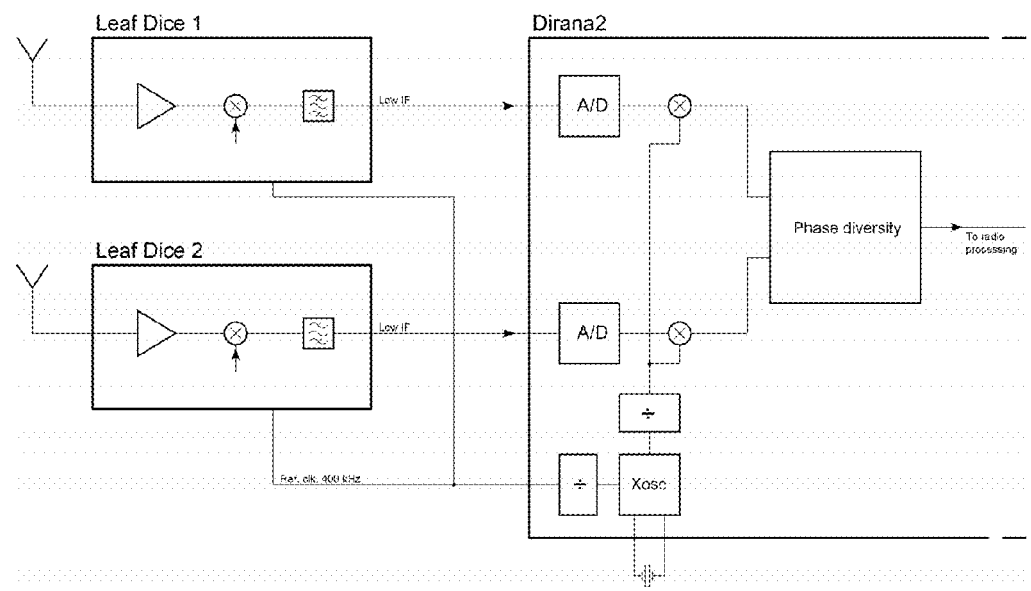
FIG. 1 illustrates a radio system using the Leaf-Dice and Dirana2 ICs.

Commercially available FM phase diversity receivers may be found in a number of configurations. Some earlier designs, for example the NXP low-IF digital chipset, the TEF7000 (Leaf-Dice) tuner front-end and SAF7740 (Dirana2) car radio digital signal processor, have two separate tuner integrated circuits (ICs) connected to the two antennae that share one crystal reference through clock transfer. The crystal reference is applied to the DSP device that generates all the system clocks including divided clocks. FIG. 1 illustrates a radio system using the Leaf-Dice and Dirana2 ICs. One of these divided clocks is used as reference frequency for the PLLs of the two tuner ICs by external interconnections between the devices. The transferred clock signal is a divided version of the actual crystal frequency such that the signal and its harmonics do not cause interference into the desired FM reception band.

In practice, additional measures such as low voltage differential signaling (LVDS) or current steering modes of operation and short printed circuit board (PCB) tracks between the devices are necessary to avoid interference. A short clock line between the two devices is also required to ensure high quality LO generation at the tuner devices that are using the remote reference signal. Long lines would function as antennae, picking up undesired noise and interference from the surroundings, thereby modulating the LO signal to the second tuner.

Nowadays, there are products, for example the NXP Dirana 3 (SAF775x family) integrated car radio and audio system on chip (SOC) that integrate both tuners and the phase diversity algorithm on the same device. Here, the advantage is that the same crystal reference with high quality is readily available to both tuners which ensures good performance.

Figure 2:
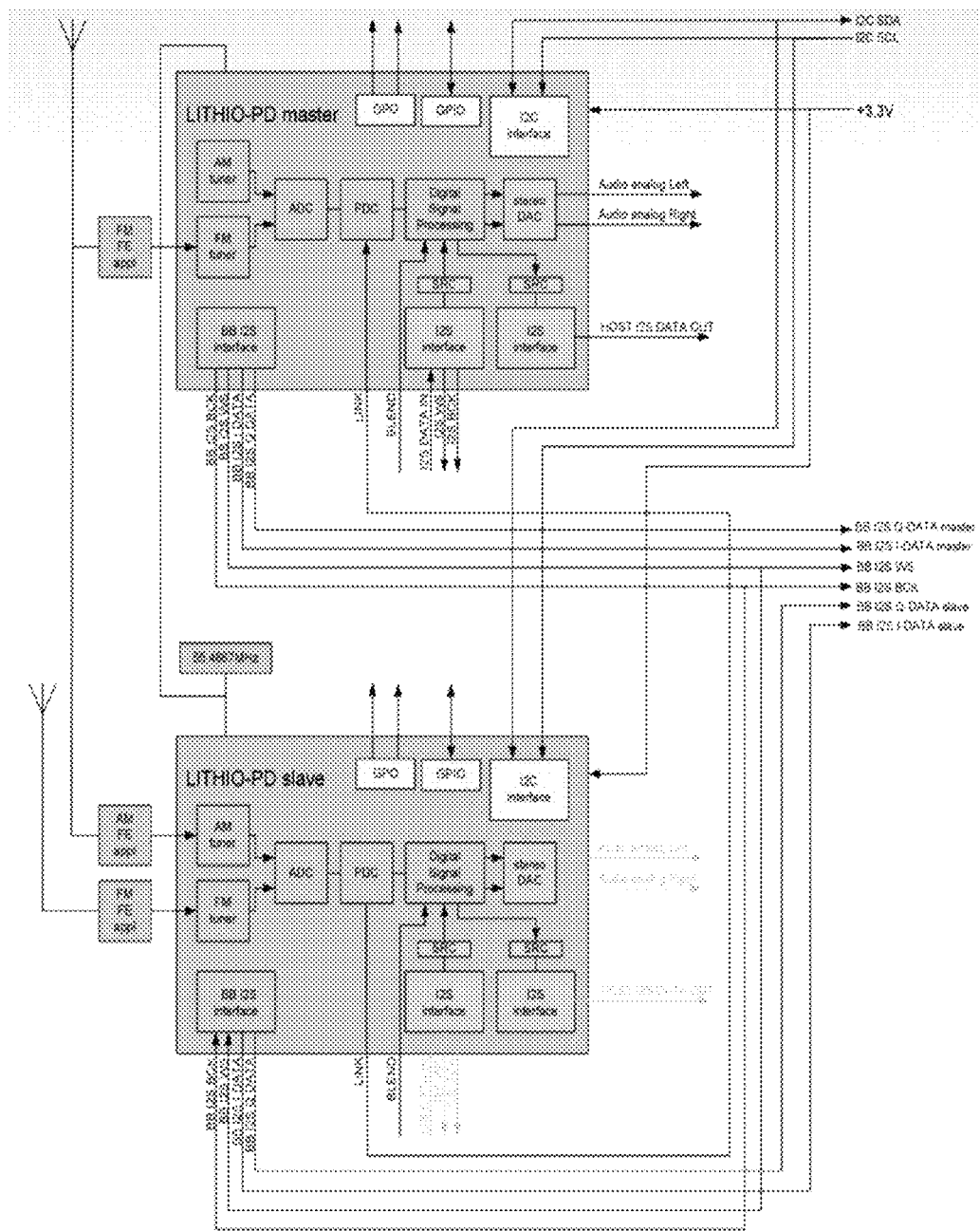
FIG. 2 illustrates an alternative arrangement that applies the crystal to two identical radio receivers directly.

As a consequence of these constraints, all devices are placed very close to each other on the board. Antenna positions on the car, however, remain at relatively large distances with respect to one another to ensure uncorrelated reception for phase diversity to function properly. Therefore, long coaxial cables are required to bring RF antenna signals to the devices on the radio board. FIG. 2 illustrates an alternative arrangement that applies the crystal to two identical radio receivers directly. Here, the receivers contain all required phase diversity signal processing on board. But still, for previously mentioned reasons, the two devices need to be very close to each other.

In all above examples, regardless of which configuration, the FM antenna signals are carried with long coaxial cables to the phase diversity receiver setup on the radio board. These cables are costly, requiring good RF performance so as not to degrade the FM input signals to the radio receivers and to shield them from interference.

Meanwhile, a number of car manufacturers are considering moving away from a central "Head Unit" infotainment concept. Instead, the idea is to make use of distributed systems, where the Head Unit is primarily the Human Machine Interface (HMI) for control and display. Radio receivers are then placed at the antennae and connected to the each other and the central HMI in the Head Unit through standard "digital cables", for example cheap twisted pairs. Unfortunately, however, such a distributed system set-up is incompatible with the above FM diversity requirements based on high performance RF coax cables. The long digital twisted pair cables will generate unacceptable radiated interference to the receiver RF and antenna circuits. Clock sharing, necessary for phase diversity algorithm to function properly, will be impractical as clock transport over long wires degrades the reference signal quality with respect to spurious and noise.

Making the transition to distributed radio systems means physically moving the two tuners away from each other and close to their respective antenna connections. This is to say, stretching the reference crystal clock and the baseband inter-IC sound (I2S) signal lines that carry the digitized FM signals required to diversity algorithm over long distances. With the current technology, the long I2S interconnection lines would generate unacceptable level of interference to the RF input of the two devices.

Moreover, there would not be a viable clocking solution to make the diversity algorithm work. Using separate crystals for each receiver would suffer from frequency offset between the clocks. Frequency offset cannot be tolerated by phase diversity algorithms as it leads to varying phase between the two antenna signals, indistinguishable from time of arrival of signals at the antennae. Clock sharing will also not be possible, as long cables will degrade reference signal quality due to noise and spurious from the surroundings. Poor quality clock reference for the PLL frequency synthesizer leads to lower signal to noise ratio for the demodulated audio signal and reduced dynamic selectivity through the "reciprocal mixing" mechanism. Furthermore, long clock lines will further contribute as source of interference to the sensitive RF circuits.

The goal of the embodiments described below is to provide a cost-effective robust digital clock and data transfer between FM receivers, but without interference to the sensitive RF circuitry and maintaining good phase diversity performance. While the embodiments described herein address phase diversity performance, the methods and apparatus described herein may be used in other systems where two diverse received radio signals are combined. Thus the phase diversity circuit may be any signal combing circuit.

In the embodiments described below, there are no separate reference clock lines, as the clock signal is extracted from a modified digital data that is transferred between the devices. As a result, there is no requirement for high performance coaxial cables, as standard twisted-pair digital cables will suffice. The actual data on the lines is modified such that its spectral density is wideband and noise-like so as to minimize interference to RF circuitry. To further reduce the actual radiation from the long data cable, low voltage differential signaling (LVDS-like) type of transceivers may be used for interfacing to the devices. The mechanisms for low spurious data generation and high performance clock extraction from the data stream are explained below.

To minimize spurs in the radio spectrum, the transmitted serial data is "whitened" or randomized. The actual transmitted bitrate may be optimized based on various requirements. It may be at a rate that may be readily generated and is compatible with the rest of the radio receiver architecture requirements. Higher bitrates give more flexibility on payload and spectral shaping.

Figure 3:
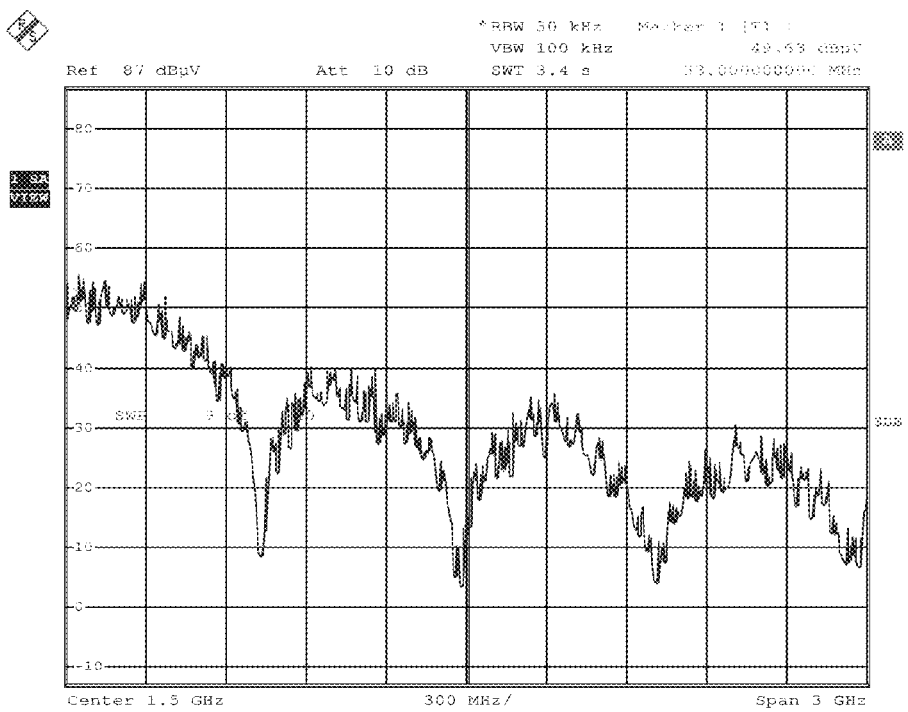
FIG. 3 illustrates a measured frequency spectrum for a 750 Mbps signal.

To illustrate the basic principles of the embodiments described herein, FIG. 2 illustrates two phase diversity devices. The receiver architecture used in this product is based on the so-called "fixed-oscillator" concept described in U.S. Pat. No. 8,503,507 which is hereby incorporated by reference for all purposes. In this example, the VCO frequency is set to approximately 6 GHz. It would be convenient to use a simple divide-by-8 to set the bitrate to 750 Mbps. A side advantage of this specific bitrate is that the noise-shaped frequency spectrum will have a notch at twice the frequency (1.5 GHz) that is close to the DAB-L frequency band. In practice, the notch would be placed just outside the DAB-L band to ensure that clock harmonic residues, if any, are outside the band. FIG. 3 illustrates a measured frequency spectrum for a 750 Mbps signal. The example used shown here is for two NXP TEF6692 receiver devices. However, there is nothing that limits the application of this concept to other receivers.

Figure 4:
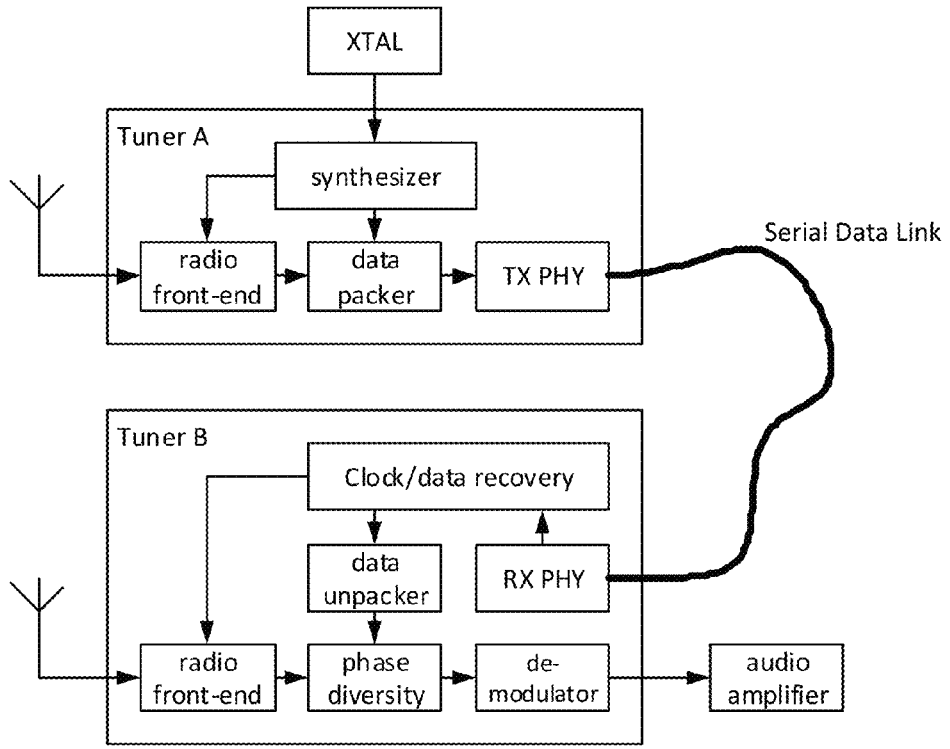
FIG. 4 illustrates a serial link set up between the two receivers as time multiplexed information streams.

A serial link is set up between the two receivers as time multiplexed information streams. FIG. 4 illustrates such a serial link. It is a goal that the spectrum of the signal transmitted on this link contains no spurs at all, as they could impair reception quality. Spurs could impair reception quality not only of the tuners that transmit and receive this signal themselves, but possibly also of other tuners that may be in the vicinity, for example, in the same car, receiving and transmitting in potentially other radio bands. Information is transmitted in packets, each belonging to a single stream. The stream information is added to packet header. Error detection information is appended to the packet, which increases link robustness. To maintain a noise-like signal spectrum, burst activity may be avoided. This may be achieved by continuously transmitting packets, adding empty packets when there is no information to be sent. To avoid packet harmonics, packets are transmitted back-to-back. Furthermore, the described serial link allows for flexible system configurations with multiple nodes connected in a ring network or as daisy chain.

Clock extraction from the above noise-like serial data stream needs to comply with stringent RF requirements of the receiver—low noise and spurious—that is beyond clock and data recovery circuits used in standard SERDES interfaces. These stringent requirements are related to LO spectral purity that are met by the on board PLL frequency synthesizer. The distributed phase diversity system set-up with PLL clock recovery is shown in FIG. 4. For simplification, only the PLL sections of the two receivers are shown. The two receivers are positioned at different locations close to their respective antennae. They are connected to each other only through the twisted-pair digital serial data interface. The receiver devices are basically as shown in FIG. 2, but with modified interface between the devices. Therefore, the following description focuses on this modified interface.

The first tuner Tuner A has the crystal reference XTAL directly connected to the device. It has therefore a good quality oscillator signal generated by the PLL. In a typical application, using the TEF6692 receiver device, the crystal frequency is in about 55 MHz and the VCO frequency is approximately 6 GHz. A divide-by-8 circuit generates the required clock at 750 MHz for the serial link circuit. The digitized FM signal to be transmitted by TX PHY in Tuner A to the second device Tuner B over the serial data link for phase diversity purposes is the "data" that is input to the digital transceiver circuit RX PHY. This data is packaged, "shaped" by randomization techniques, and re-clocked to the 750 MHz reference. The resulting data stream is then noise-like, with no spurs and no burst activity. This data stream is then transmitted using the LVDS-like interface to the twisted-pair cable of the Serial Data Link to the second receiving device Tuner B at a remote location.

Figure 5:
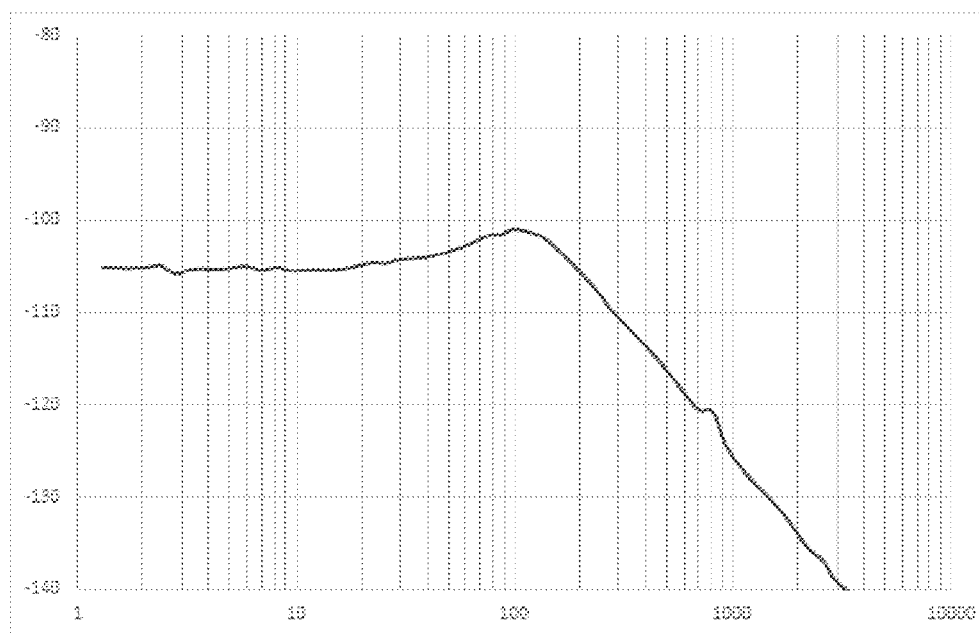
FIG. 5 illustrates a measured VCO frequency spectrum after locking to data stream.

The second tuner Tuner B has no crystal reference to its PLL. Instead, the received noise-like data stream is used as reference. Since the data stream is at a different (750 MHz) frequency to the normally used (55 MHz) reference, the PLL parameter setting for the programmable feedback divider, phase detector/charge pump and loop filter are different from the PLL that uses the crystal reference. Circuit simulations and measurements confirm that with careful choice of system parameters, see FIG. 5, it is possible for the second PLL to lock to the noise-like data stream and generate a "clean" VCO signal that is of adequate quality (noise and spurious) for the receiver. Frequency divided versions of the same VCO signal can then be used as reference to re-clock and de-whiten the data stream, thereby reconstructing the data required for the phase diversity algorithm.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A radio receiver comprising:
   a serial data interface configured to receive a serial data signal, corresponding to a first received radio signal produced by a first clock signal from an oscillator and a first antenna, from another radio receiver;
   wherein the serial data signal provides the first received radio signal and a second clock signal;
   wherein the second clock signal corresponds to the first clock signal;
   a clock and data recovery circuit configured to produce the second clock signal and the first received radio signal from the serial data signal; and
   a radio front-end coupled to a second antenna and configured to receive the second clock signal from the clock and data recovery circuit and to produce a second received radio signal; and
   a signal combining circuit configured to combine the second received radio signal and the first received radio signal.

2. The radio receiver of claim 1, wherein the signal combining circuit is a phase diversity circuit configured to phase align the second received signal and the first received radio signal.

3. The radio receiver of claim 1, wherein the serial data signal is a wideband noise-like signal.

4. The radio receiver of claim 1, wherein the serial data interface is configured to connect to a twisted-pair cable.

5. The radio receiver of claim 1, wherein the serial data interface is a low voltage differential signaling interface.

6. The receiver of claim 1:
   wherein the second received signal is produced by mixing a signal from the second antenna with the second clock signal.

7. A radio system comprising:
a first radio receiver comprising:
a first radio front-end configured to receive a first clock signal from an oscillator to produce a first received signal; and
a first serial data interface configured to transmit a serial data signal to a second radio receiver, wherein the serial data signal provides the first received signal and a second clock signal to the second radio receiver, wherein the second clock signal corresponds to the first clock signal;
the second radio receiver comprising:
a second data interface configured to receive the serial data signal from the first radio receiver;
a clock and data recovery circuit configured to produce the second clock signal and the first received signal from the serial data signal;
a second radio front-end configured to receive the second clock signal from the clock and data recovery circuit to produce a second received signal; and
a signal combining circuit configured to combine the first received signal and the second received signal.

8. The radio system of claim 7, wherein the signal combining circuit is a phase diversity circuit configured to phase align the first received signal and the second received signal.

9. The radio system of claim 7, wherein the serial data signal is a wideband noise-like signal.

10. The radio system of claim 7, wherein the serial data interface is configured to connect to a twisted-pair cable.

11. The radio system of claim 7, wherein the serial data interface is a low voltage differential signaling interface.

* * * * *